United States Patent [19]
Polinsky

[11] 3,988,417
[45] Oct. 26, 1976

[54] PROCESS FOR CHLORINATING METAL SULFIDE MATERIALS

[75] Inventor: Samuel M. Polinsky, Salt Lake City, Utah

[73] Assignee: Kennecott Copper Corporation, New York, N.Y.

[22] Filed: June 10, 1971

[21] Appl. No.: 151,819

[52] U.S. Cl.................. 423/40; 423/571; 423/491; 423/493; 204/64 R; 75/114; 75/117
[51] Int. Cl.²................. C01B 17/06; C01G 49/10; C01G 3/04
[58] Field of Search............... 75/114, 113; 23/87 R, 23/97, 224; 423/493, 491, 544, 40, 571

[56] References Cited
UNITED STATES PATENTS

| | | | |
|---|---|---|---|
| 691,822 | 1/1902 | Swinburne et al.................. | 23/97 X |
| 841,103 | 1/1907 | Baker et al...................... | 75/113 X |
| 1,078,779 | 11/1913 | Forland............................. | 23/87 R |
| 2,010,756 | 8/1935 | Genter.............................. | 423/493 |
| 2,126,455 | 8/1938 | Dettwyler......................... | 423/493 |
| 2,895,796 | 7/1959 | Hill................................... | 423/493 X |
| 2,895,797 | 7/1959 | Hill................................... | 23/87 R |
| 3,128,150 | 4/1964 | Brothers............................. | 23/87 R |
| 3,180,706 | 4/1965 | Erickson............................. | 23/87 R |
| 3,278,257 | 10/1966 | Tyree, Jr. et al................. | 23/87 R X |
| 3,607,143 | 9/1971 | Wierman et al.................... | 23/224 |
| 3,652,219 | 3/1972 | Peters et al....................... | 23/224 |

*Primary Examiner*—Edward Stern
*Attorney, Agent, or Firm*—Mallinckrodt & Mallinckrodt

[57] ABSTRACT

A chemical process for treating metal sulfide materials, such as copper sulfide concentrates, to produce water-soluble metal chlorides and preclude the production of undesirable sulfur oxides. Such a metal sulfide material is contacted with an effective amount of a chlorinating reagent solution at a temperature below the boiling point of the reagent solution. The reaction proceeds until the metal sulfides are converted into metal chlorides and elemental sulfur is formed. The chlorinating reagent solution contains a chlorinating agent having a labile chlorine atom capable of reacting with the metal values to form metal chlorides, and at least one liquid hydrocarbon solvent which is capable of solubilizing both the chlorinating agent and the elemental sulfur produced during the reaction. The metal chloride product, which is insoluble in the reagent solution, is recovered from such solution by conventional means, e.g. by filtration, for conversion into the metal or metals.

1 Claim, 1 Drawing Figure

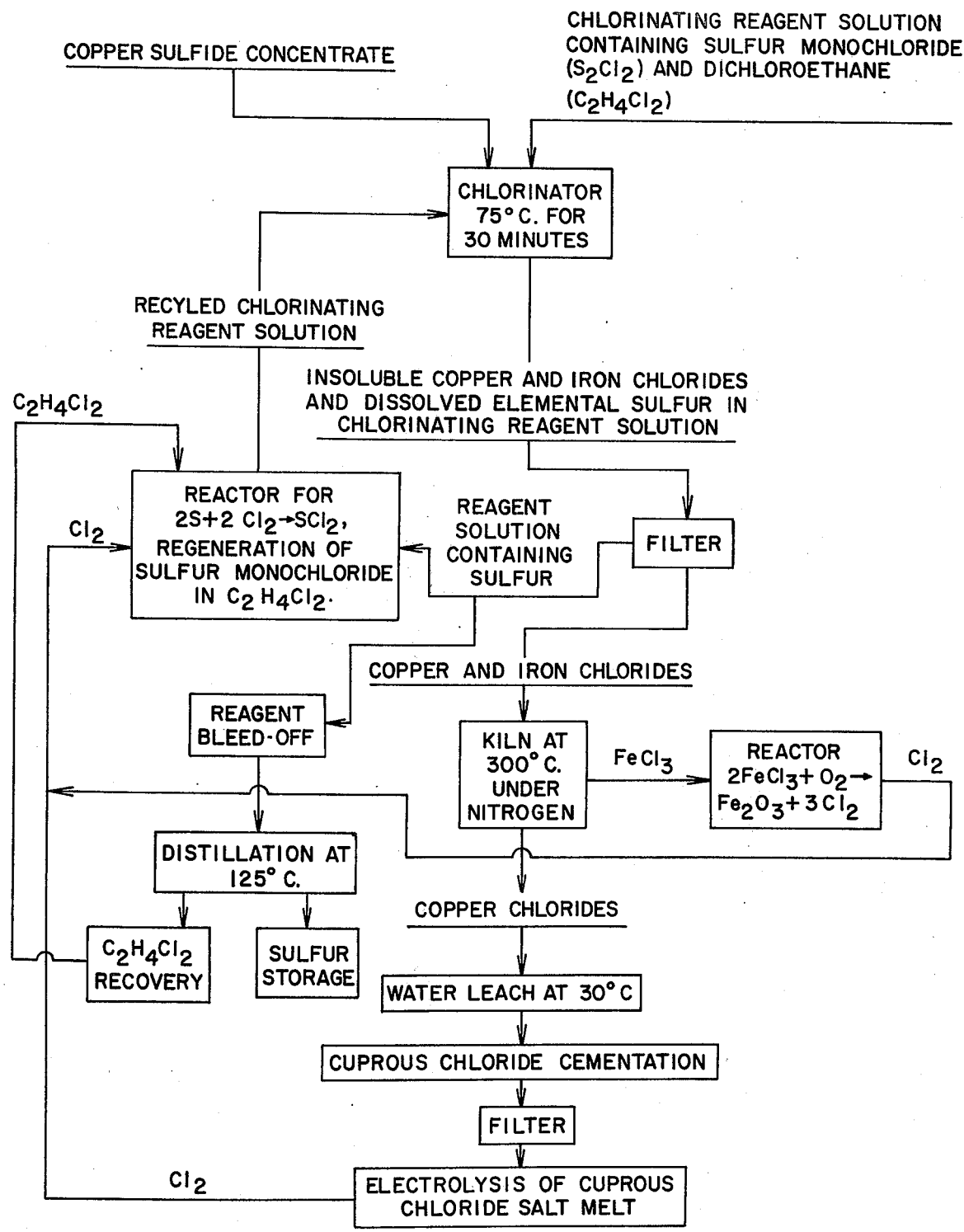

PROCESS FOR CHLORINATING METAL SULFIDE MATERIALS

BACKGROUND OF THE INVENTION

1. Field

This invention relates to hydrometallurgical processes for chlorinating metal sulfide materials to produce metal chlorides.

2. State of the Art

Although hydrometallurgical processes are well known, many metals are customarily extracted from their ores by smelting. For example, copper sulfide ores are normally subjected to concentration procedures, and the concentrates are then smelted to produce impure metallic copper, which is then refined to the desired purity. The sulfur values in the concentrates form gaseous sulfur oxides during the smelting phase of this overall processing of the ore.

The production of large amounts of these sulfur oxide gases, which, when released into the atmosphere, cause significant air pollution, is a major disadvantage of smelting processes. Increasing attention is being given at all levels of government to ways of eliminating air pollution, especially that caused by the venting to the atmosphere of gaseous sulfur oxides. Accordingly, the hydrometallurgical approach is being favorably considered by the metallurgical art as an alternative to the smelting of ore materials.

Among proposed hydrometallurgical processes are ones employing a chlorinating agent to chlorinate the ore materials and form chlorides of the particular metal values to be recovered, the metallic chlorides being then further processed into metal. Two major problems have been encountered in chlorination processes: (1) Large excesses of the chlorinating agent over stoichiometric have been required to effectively extract the metal values from the minerals, and, since such agents are expensive, the economics have proven prohibitive. (2) Even after the metal values have been extracted as chlorides, it has been found extremely difficult to separate the metal chlorides from the elemental sulfur released from the sulfide minerals and present in the reaction medium with the metal chlorides. Attempts to remove the sulfur by volatilization have required tempertures of over 445° C. (the boiling point of sulfur), which are expensive to maintain. To date, these major problems have prevented serious consideration of chlorination as an alternative to the presently employed smelting of sulfide ore materials.

OBJECTIVES

It was an objective in developing the present process to eliminate the requirement for large excesses of chlorinating agents in chlorinating the metal values found in sulfide ore materials. It was another objective to provide means for simply and conveniently separating metal chlorides and elemental sulfur in the reaction medium, without resorting to high volatilizing temperatures.

SUMMARY OF THE INVENTION

In accordance with the invention, metal values contained in a sulfide ore material are chlorinated to produce metal chlorides by contacting the ore material with an effective amount of a chlorinating reagent solution at a temperature below the boiling point of the reagent solution. Elemental sulfur is produced during the chlorinating reaction and is solubilized in the reaction medium. The metal chlorides, which are insoluble in the reagent solution, are recovered from the solution by conventional means, such as filtration followed by water leaching to separate the water-soluble metal chlorides from the insolubles, including gangue derived from the sulfide materials. The elemental sulfur remains dissolved in the reagent solution.

The chlorinating reagent solution contains at least two components, (1) a chlorinating agent having a labile chlorine atom capable of reacting with metal values in the sulfide material to form metal chlorides, and (2) at least one liquid hydrocarbon solvent which is insoluble in water and is capable of solubilizing both the sulfur from the sulfide materials and the chlorinating agent. In order for all of the metal values in the sulfide ore material to be converted into metal chlorides, it is necessary that at least a stoichiometric amount of chlorinating agent be present in the reagent solution to react with the metal values. The reaction continues for a period of time sufficient to chlorinate substantially all of the metal values and to liberate elemental sulfur from the sulfides.

Suitable chlorinating agents having a labile chlorine atom include sulfur monochloride, sulfur dichloride, as well as other chlorinating agents which are known to chlorinate metal values. The liquid hydrocarbon solvent functions as a carrier for the chlorinating agent and must be capable of solubilizing the chlorinating agent, whether the agent is liquid or solid, as well as of solubilizing the elemental sulfur which is produced during the reaction. Preferred hydrocarbon solvents include chlorinated aliphatic and aromatic hydrocarbons, since they have greater ability to solubilize sulfur than do the unsubstituted liquid hydrocarbons.

The hydrocarbon solvent provides a compatible medium for the reaction between the chlorinating agent and the metal sulfide, so that large excesses of the chlorinating agent are not required. In addition, the solubilized elemental sulfur is easily separated from the insoluble metal chlorides in the reaction medium.

THE DRAWING

The best mode presently contemplated for carrying out the invention is illustrated in the accompanying drawing in which the single FIGURE is a flowsheet showing the process as applied to a copper sulfide concentrate employing a chlorinating reagent solution containing sulfur monochloride as the chlorinating agent in a dichloroethane hydrocarbon solvent.

DETAILED DESCRIPTION OF THE ILLUSTRATED PROCEDURE

As illustrated in the accompanying flowsheet, a quantity of copper sulfide flotation concentrate is contacted in a chlorinating apparatus with an amount of reagent solution, comprising a binary mixture of sulfur monochloride as the chlorinating agent and dichloroethane as the hydrocarbon solvent, effective to form copper and iron chlorides, which are insoluble in the reagent solution, and to liberate elemental sulfur, which is soluble in the reagent solution. The reaction in the chlorinating apparatus is allowed to proceed for a suitable length of time, usually about thirty minutes, and at a suitable temperature, usually about 75° C.

The reaction mixture containing the insoluble copper and iron chlorides, gangue, and dissolved sulfur is filtered to separate the insolubles from the reagent solution. The copper and iron chlorides are then calcined in a kiln at a suitable temperature, e.g., about 300° C., under nitrogen or other suitable inert atmosphere to drive off the volatile iron chlorides. The volatilized iron chlorides can be reacted with oxygen to form ferric oxides, generating free chlorine gas which can be utilized to regenerate the sulfur monochloride chlorinating agent.

Following the calcination step, the remaining water-soluble cupric chlorides are leached with water and are subjected to a cementation process using finely crushed copper metal as the precipitating agent. The precipitated cuprous chloride values are filtered and subjected to electrolysis to recover the copper metal and to generate free chlorine gas. Alternatively, the water-soluble copper chloride can be subjected to electrolysis to form copper metal with chlorine and hydrogen gases being evolved at the anode.

The process lends itself to a cyclical operation in which sulfur monochloride is regenerated by reacting the chlorine gas, generated by the reaction of iron chlorides with oxygen and by the electrolysis of cuprous chloride, with the elemental sulfur recovered from the pregnant reaction solution. Dichloroethane can be recovered by periodically bleeding off quantities of the reagent containing the dissolved elemental sulfur and distilling the reagent solution at about 125° C. to produce bulk elemental sulfur and purified dichloroethane. The sulfur monochloride, when dissolved in the purified dichloroethane solvent, produces regenerated chlorinating reagent solution which can be recycled to the chlorinator.

Although the procedure as illustrated in the flowsheet is applied to the chlorination of copper sulfide materials, the process is also effective with any metal sulfide material which forms a metal chloride upon exposure to an appropriate chlorinating agent. For example, zinc, silver, lead, nickel, cobalt, and manganese sulfides can be treated in accordance with the disclosed process to extract the metal values from the mineral, thereby eliminating production of undesirable sulfur oxides present in conventional smelting operations. Other metals such as aluminum, found in aluminum clays or alunites as a sulfate or sulfide, can be treated in accordance with the process to extract the aluminum values as chlorides. In general, any metal capable of forming a chloride when exposed to a chlorinating agent can be successfully treated in accordance with the process.

A typical binary system is exemplified by a chlorinating reagent solution containing sulfur monochloride dissolved in dichloroethane.

The chlorinating reagent solution can contain multiple components, such as more than one liquid hydrocarbon solvent and/or more than one chlorinating agent. Thus, a typical ternary system comprises a mixture of benzene and dichlorobenzene as the solvent with sulfur monochloride as the chlorinating agent. An advantage in the ternary system is the ability to vary the sulfur solubility of the liquid hydrocarbon solvent by varying the ratio of the two hydrocarbon solvents in the reagent solution. In the benzene and dichlorobenzene solvent mixture, sulfur solubility can be increased from 60% to 300% depending upon the ratio of the amounts of the two solvents in the mixture. A further advantage of this particular ternary system is that the two hydrocarbon solvents are separable into two layers below 105° C. Above 105° C. the two solvents are completely miscible. Below 105° C. however, the benzene-dichlorobenzene mixture separates into two layers in which the lower layer is dichlorobenzene. The dichlorobenzene component can be saturated with sulfur in the chlorination reaction at a temperature above 105° C., and then bled off at a temperature below 105° C. to separate most of the elemental sulfur from the reagent.

In general, the chlorination reaction can proceed at any temperature above ambient and below the boiling point of the particular chlorinating reagent solution selected for use. In most hydrocarbon solvents and chlorinating reagents, reaction temperatures above about 115° C. will not be required, although higher temperatures can be used if desirable.

To ensure complete chlorination of the contained metal values in the sulfide materials, it is necessary that at least a stoichiometric amount of chlorinating agent (based on the concentration of chlorinatable metal values in the sulfide minerals) be present in the chlorinating reagent solution. The amount of chlorinating reagent solution needed to contact a given quantity of sulfide material and provide complete chlorination of the metal values will depend upon the concentration of chlorinating agent in the reagent solution. The ratio of chlorinating agent to liquid hydrocarbon solvent in the chlorinating solution can vary according to the amount of sulfur to be solubilized and recovered. For many solvents, it has been found that a ratio of 1:1 will accomplish the chlorination of the metal values and solubilization of the sulfur, although other ratios are employable. If all of the metal values in the sulfide material are to be extracted, the amount of chlorinating reagent solution employed will contain at least a stoichiometric amount of the chlorinating reagent to chlorinate all of the metal values. This eliminates the necessity for great excesses of the chlorinating agent.

The specific liquid hydrocarbon solvent used in the chlorinating reagent solution is selected on the basis of the ability of the particular hydrocarbon to solubilize sulfur and form a solution with the chosen chlorinating agent. It is desirable, although not necessary, that the chlorinating agent and the hydrocarbon solvent boil at near the same temperature.

It is known that the solubility curve for sulfur is very different in organic solvents than in aqueous solutions. The solubility curve for sulfur in saturated hydrocarbons increases with the specific gravity of the particular hydrocarbon. A sharp increase in sulfur solubility at 60° C. is characteristic for saturated hydrocarbons and is not related directly to the number of carbons in the compound. Consequently, hydrocarbons such as the paraffins, olefins, diolefines, naphthenes, and aromatics increase sulfur solubility with temperature and with the specific gravity of the hydrocarbon group. In the aromatic hydrocarbons, solubility of sulfur decreases with the introduction of a methyl group and increases with the introduction of a chlorine atom to the ring. Accordingly, homologs of saturated hydrocarbons or chlorinated hydrocarbons and benzene-type hydrocarbons increase sulfur solubility as a result of specific gravity and/or a halogen incorporated into the hydrocarbon structure.

The halogenated hydrocarbons are miscible with most organic solvents and are good solvents for sulfur. In addition, their low flammability is utilized to raise the flash points of highly volatile solvents. In general, solvents of either the aliphatic or aromatic type, either straight chain or branched, may be used in the chlorinating reagent solution, so long as the solvent has a suitable degree of solubility for sulfur and for the chlorinating agent. The preferred hydrocarbon solvents are the chlorinated aliphatic hydrocarbons, either straight chain or branched, such as methylene dichloride, dichloroethane, and dichloropentane, and homologs of the chlorinated hydrocarbon series which are liquids and essentially insoluble in water. Various aromatic solvents may also be used, such as benzene, toluene, xylene, and other aromatic solvents. The solvents may contain any substituted alkyl group, such as cyclohexylchloride, benzylchloride, or n-octylchloride, and are liquid and insoluble in water. Accordingly, both aliphatic and aromatic liquid hydrocarbon solvents may be used, with the chlorinated hydrocarbons in most instances providing improved sulfur solubility. It is preferred to have a hydrocarbon solvent which has not more than 25 carbon atoms in a molecule, since these substituents contribute greatly to the molecular weight and cost without improving operability of the solvent.

A variety of typical hydrocarbon solvents useful for the present invention include the following:

| | |
|---|---|
| Dichloromethane | Propylene dichloride (1,2 dichloropropane) |
| Ethyl Chloride | Trichloropropane |
| Dichloroethane | n-Butylchloride |
| Beta-Trichloroethane | n-Amylchloride (1-chloropentane) |
| Trichloroethylene | Dichloropentane |
| Trichloroethane | n-Hexylchloride |
| 1,1,2,2 Tetrachloroethane | Monochlorobenzene |
| Tetrachloroethylene | O-dichlorobenzene |
| Pentachloroethane | Trichlorobenzene |
| Isopropylchloride | Orthochlorotoluene Parachlorotoluene |
| Allychloride (3-chloropropene-1) | Monochlorotoluene |

Other compounds within the scope of the present invention may be devised. It is a simple matter to determine the effectiveness of the solvent by determining the solubility of sulfur in the solvent or mixture of solvents.

Chlorinating agents which can be employed in the chlorinating reagent solution are those agents which have a labile chlorine atom available for chlorinating the metal sulfides. In addition to sulfur monochloride, other effective chlorinating agents include:

| | | | |
|---|---|---|---|
| Inorganic chlorides: | | | |
| $S_2Cl_2$ | sulfur monochloride | | |
| $SCl_2$ | sulfur dichloride | HCl | anhydrous hydrochloric acid |
| $SCl_4$ | sulfur tetrachloride | $PCl_5$ | phosphorous pentachloride |
| $S_2O_5Cl_2$ | pyro sulfuryl chloride | $PCl_3$ | phosphorous trichloride |
| $S_2O_3Cl_4$ | sulfur oxytetrachloride | $PSCl_3$ | phosphorous sulfochloride |
| $SOCl_2$ | thionyl chloride | $POCl_3$ | phosphorous oxychloride |
| $SO_2Cl_2$ | sulfuryl chloride | | |
| Organic chlorides: | | | |
| Benzylchloride | | | |
| O-,p-xylene dichloride | | | |
| T-butyl hypochlorite | | | |
| Trichloromethane sulfonyl chloride | | | |
| n-chloroamides | | | |
| n-chlorosulfonamide | | | |
| Iodobenzene dichloride | | | |

Organic chlorides:
Benzylchloride
O-, p-xylene dichloride
T-butyl hypochlorite
Trichloromethane sulfonyl chloride
n-chloroamindes
n-chlorosulfonamide
Iodobenzene dichloride

EXAMPLE I

A copper sulfide concentrate containing $CuFeS_2$ as a major constituent was converted to the recoverable copper and ferric chloride as follows:

A 250 milliliter round-bottom flask was equipped with a reflux condenser and thermometer. One hundred grams of the concentrate ($CuFeS_2$), 75 grams (0.6 moles) of $S_2Cl_2$, and 75 grams (0.8 moles) of dichloroethane were introduced into the flask. This mixture was then allowed to react with gentle agitation for 30 minutes at 80° C. The insoluble products were isolated from the reaction mixture by filtration and were leached with water. Assays of the resulting leached solution and residue showed that the contained copper and iron had been converted completely into water-soluble chlorides.

Separation of the iron and copper chlorides can be accomplished either before or after the water leach by known means. The sulfur in the reaction medium can be recovered as elemental sulfur or can be converted into sulfur monochloride or dichoride and recycled to the reaction medium.

Whereas this invention is illustrated and described herein with respect to certain preferred forms thereof, it is to be understood that many variations are possible without departing from the inventive concepts particularly pointed out in the claims.

I claim:

1. A process for chlorinating a concentrate of copper sulfide minerals to produce metal chlorides, comprising: contacting said concentrate with an amount of a chlorinating reagent solution at a temperature of about 80° C and for a time period of about 30 minutes to chlorinate the metal values and to solubilize the the sulfur values in an unreacted state, thereby producing water-soluble metal chlorides which are insoluble in the reagent solution and elemental sulfur which is dissolved in the reagent solution, said chlorinating reagent solution containing $S_2Cl_2$ and dichloroethane, said $S_2Cl_2$ being present in the reagent solution in an amount at least stoichiometric with the metal values in the sulfide materials, and recovering the metal product from the reaction mixture separately from the elemental sulfur.

* * * * *